July 31, 1934.   W. L. HAMILTON   1,968,391
COMBINED VALVE AND NOZZLE
Filed Jan. 18, 1933
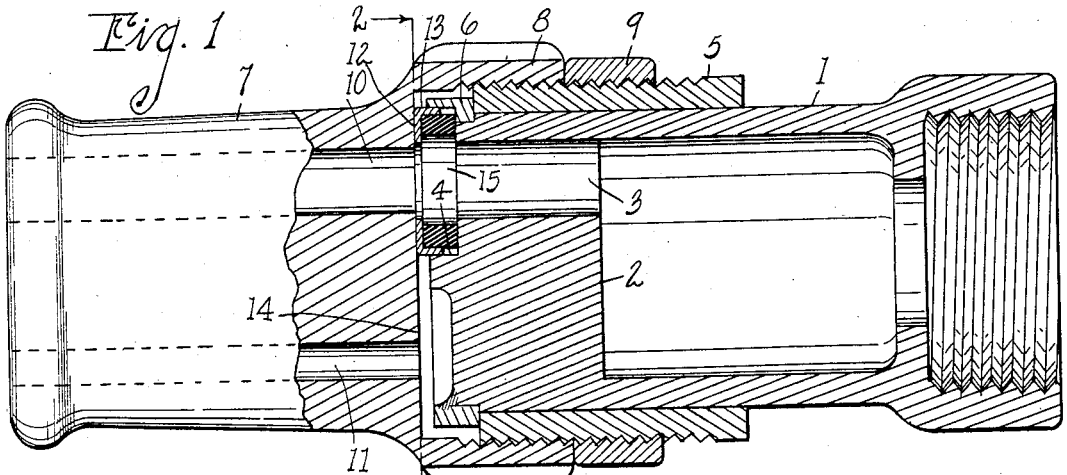
Fig. 1
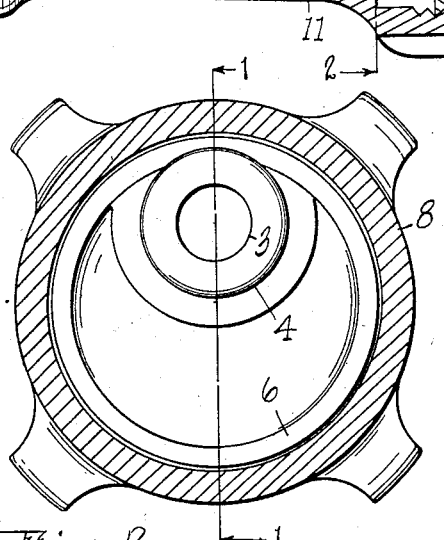
Fig. 2
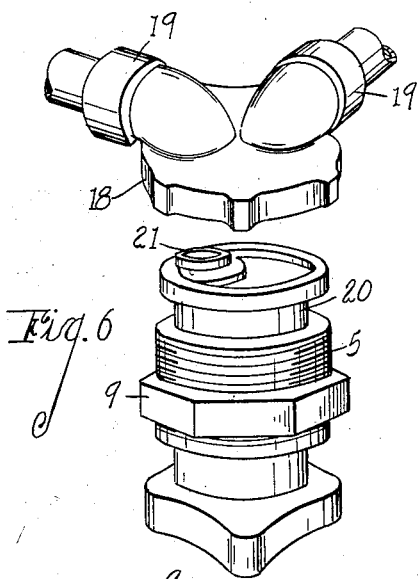
Fig. 6
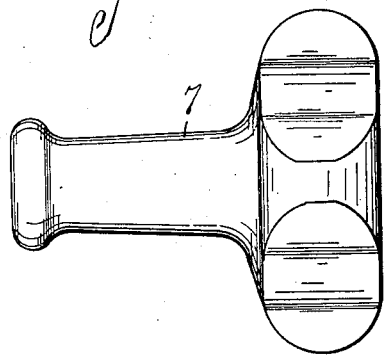
Fig. 3
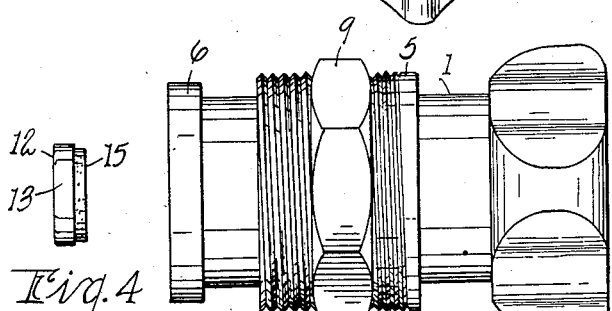
Fig. 4
Fig. 5
INVENTOR
William L. Hamilton
BY
Chappell Earl
ATTORNEYS Patented July 31, 1934

1,968,391

UNITED STATES PATENT OFFICE 1,968,391

COMBINED VALVE AND NOZZLE

William L. Hamilton, Bangor, Mich.

Application January 18, 1933, Serial No. 652,253

10 Claims. (Cl. 299—139)

The main objects of this invention are:

First, to provide a variable nozzle for fire hose and the like which may be easily adjusted to deliver streams of different sizes and at the same time one which does not leak.

Second, to provide a combined valve and variable nozzle which is very simple in its parts and one in which the pressure of the fluid acts to seal the valve or prevent passage of the fluid.

Third, to provide an improved valve structure which is well adapted to hose nozzles, soda fountain nozzles and in various other relations.

Objects relating to details and economies of my invention will appear from the description to follow. The invention is defined and pointed out in the claims.

A structure which is a preferred embodiment of my invention is illustrated in the accompanying drawing, in which:

Fig. 1 is a view in side elevation partially broken away and shown in longitudinal section of a combined valve and nozzle embodying the features of my invention, the section being taken on line 1—1 of Fig. 2.

Fig. 2 is a transverse section on line 2—2 of Fig. 1.

Fig. 3 is a view in side elevation of the head.

Fig. 4 is a view in side elevation of the valve facing assembly.

Fig. 5 is a view in side elevation of the body member and sleeve assembly.

Fig. 6 is a perspective view of a modification, the parts thereof being shown in extending position.

The embodiment of my invention illustrated in Figs. 1 to 5 inclusive is my commercial form of hose nozzle. It comprises a cylindrical chambered body member 1 having a transverse wall 2 at its outer end with a single eccentrically disposed discharge port or passage 3 therein. At the outer end of this port or discharge is a cylindrical recess 4 which constitutes a walled packing or gasket seat.

An externally threaded sleeve 5 is rotatably mounted on the body. This sleeve is rotatably retained on the body by the retaining ring or collar 6 which is welded to the body. The head or nozzle member 7 has a coupling flange 8 threaded upon the sleeve so that the head is rotatably secured to the body, a locking nut 9 being provided for securing the head in its adjusted position.

The head has discharge passages 10 and 11 of varying sizes positioned eccentrically so that they may be selectively brought into register with the port 3 by rotative adjustment of the head, and also the head is rotated to close the nozzle or valve. The inner end of the head has a flat valve face 14 common to the passages 10 and 11.

An annular resilient packing, preferably of rubber, is arranged on the packing seat and is provided with an annular metal facing 12 having an annular flange 13 slidably engaging the wall of the seat, the resilient packing or gasket 15 acting to urge this metal facing against the valve face of the head, both when the head is in position to register one of its discharge passages with the passage or port 3 and also when the head is rotated to close the port 3 as results when the head is rotated to bring a portion of the valve face intermediate the passages into coacting relation with this packing element.

With this arrangement, the pressure of fluid acts upon the resilient gasket member and also the acts upon the resilient gasket member and also the inwardly projecting edge of the facing which is preferably arranged to project within the packing member 15 as shown in Fig. 1 so that a very effective valve is provided. Desired pressure on the resilient packing may be had by adjustment of the head on the sleeve. If desired, the nozzle may be provided with a head having a single discharge orifice.

In the embodiment shown in Fig. 6, 18 becomes a body member provided with a plurality of connections 19. In this embodiment, the member 20 which corresponds generally to the body in the other adaptations is rotatably adjustable relative to the member 18 to bring the port 21 into selective registry with one of the connections 19.

In my improved valve and nozzle assembly, leakage at the joint is positively prevented at all times by the gasket and cushion assembly which I dispose between the head and body member. The device is effective and efficient in this respect and is extremely simple and economical in its parts. While I prefer to use a metallic facing and a rubber gasket or packing in my device, it will be understood that other materials having equivalent characteristics may be used.

I have illustrated and described my improvements in embodiments which I have found very practical. I have not attempted to illustrate or describe other embodiments or adaptations, as it is believed this disclosure will enable those skilled in the art to embody or adapt my improvements as may be desired.

Having thus described my invention, what I claim as new and desire to secure by Letters Patent, is:

1. A nozzle comprising a cylindrical body member having a transverse end wall provided with a single eccentric discharge port and a cylindrical recess at the outer end thereof providing a packing seat, an externally threaded sleeve rotatable on said body member, a sleeve retaining collar at the outer end of said body member, a nozzle head having a coupling flange threaded to said sleeve and discharge passages of different sizes disposed eccentrically so that they may be selectively registered with said port, said head having an inner flat valve face common to all the passages, a lock nut threaded to said sleeve to abut with said head flange, an annular metallic packing facing member coacting with said valve face and having an annular flange slidably engaging the cylindrical wall of said recess, and an annular rubber packing member disposed on said packing seat and acting to urge said facing into contact with the valve face of said head, the inner edge of said facing projecting inwardly beyond the packing member so that it is urged by the fluid against the valve face.

2. A nozzle comprising a cylindrical body member having a transverse end wall provided with a single eccentric discharge port and a cylindrical recess at the outer end thereof providing a packing seat, an externally threaded sleeve rotatable on said body member, a nozzle head having a coupling flange threaded to said sleeve and discharge passages of different sizes disposed eccentrically so that they may be selectively registered with said port, said head having an inner flat valve face common to all the passages, an annular metallic packing facing member coacting with said valve face and having an annular flange slidably engaging the cylindrical wall of said recess, and a resilient packing member disposed on said packing seat and acting to urge said facing into contact with the valve face of said head.

3. A nozzle comprising a chambered body member having an eccentric discharge port and an annular walled packing seat surrounding said port, a sleeve rotatable on said body member, a head adjustably connected to said sleeve and having discharge passages of different sizes disposed eccentrically so that they may be selectively registered with said port, said head having an inner flat valve face common to all the passages, an annular metallic packing facing member coacting with said valve face and having an annular flange slidably engaging a wall of said seat, and an annular rubber packing member disposed on said packing seat and acting to urge said facing into contact with the valve face of said head, the inner edge of said facing projecting inwardly beyond the packing member so that it is urged by the fluid against the valve face.

4. A nozzle comprising a chambered body member having an eccentric discharge port and an annular walled packing seat surrounding said port, a head rotatable on said body member and having discharge passages of different sizes disposed eccentrically so that they may be selectively registered with said port, said head having an inner flat valve face common to all the passages, an annular metallic packing facing member coacting with said valve face and having an annular flange slidably engaging a wall of said seat, and an annular rubber packing member disposed on said packing seat and acting to urge said facing into contact with the valve face of said head, the inner edge of said facing projecting inwardly beyond the packing member so that it is urged by the fluid against the valve face.

5. A nozzle comprising a chambered body member having an eccentric discharge port and a packing seat surrounding said port, a sleeve rotatable on said body member, a head rotatable on said body member and having discharge passages of different sizes disposed eccentrically so that they may be selectively registered with said port, said head having an inner flat valve face common to all the passages, an annular metallic packing facing member coacting with said valve face, and a resilient packing member disposed on said packing seat and acting to urge said facing into contact with the valve face of said head, the inner edge of said facing projecting inwardly beyond the packing member so that it is urged by the fluid against the valve face.

6. A nozzle comprising a chambered body member having a discharge port and a packing seat surrounding said port in concentric relation, a head having a discharge passage registered with said port, said head having an inner flat valve face, an annular packing facing member coacting with said valve face, and a resilient packing member disposed on said packing seat and acting to urge said facing into contact with the valve face of said head, the inner edge of said facing projecting inwardly beyond the packing member so that it is urged by the fluid against the valve face.

7. A nozzle comprising a chambered body member having an eccentric discharge port and an annular recessed packing seat surrounding said port with the recess concentric with the port, a sleeve rotatable on said body member, a head adjustably connected to said sleeve and having discharge passages of different sizes disposed eccentrically so that they may be selectively registered with said port, said head having an inner flat valve face common to all the passages, and an annular resilient packing element disposed on said seat and coacting with said valve face.

8. A valve structure comprising a body member having a discharge port disposed eccentrically thereof, a head member rotatably associated with said body member and having eccentrically disposed passages of different diameters positioned to be brought into register with said port of said body member by a rotative movement of said one member, said head having an inner flat valve face, an annular resilient packing seated on the end of said body member concentric with its discharge port, and an annular metallic facing for said gasket coacting with the valve face of said head and slidably supported by said body member for movement axially of the port.

9. A valve comprising a body member having a transverse end wall provided with an eccentric opening and a recess at the end thereof, a closure member having a passage for registry with said opening, a gasket having a flange slidably engaging the wall of said recess, and a tubular cushion seated in said recess and acting to urge said gasket into contact with the inner face of said closure member.

10. A valve comprising a body member having a wall provided with an opening and a recess at the end thereof, a closure member having a passage for registery with said opening, a gasket having an annular flange slidably engaging the wall of said recess, and means having a resilient wall seated in said recess and acting to urge said gasket into contact with the inner face of said closure member and to provide a seal back of said gasket.

WILLIAM L. HAMILTON.